United States Patent
Bondada et al.

(10) Patent No.: US 9,250,868 B2
(45) Date of Patent: Feb. 2, 2016

(54) SYSTEM AND METHOD FOR GENERATING A DEVICE DRIVER USING AN ARCHIVE OF TEMPLATE CODE

(71) Applicant: Vayavya Labs Private. Limited, Belgaum (IN)

(72) Inventors: Uma Bondada, Belgaum (IN); Sandeep Pendharkar, Bangalore (IN); Venugopal Kolathur, Belgaum (IN)

( * ) Notice: Subject to any disclaimer, the term of this patent is extended or adjusted under 35 U.S.C. 154(b) by 20 days.

(21) Appl. No.: 14/490,980

(22) Filed: Sep. 19, 2014

(65) Prior Publication Data

US 2015/0089515 A1    Mar. 26, 2015

(30) Foreign Application Priority Data

Sep. 21, 2013 (IN) .......................... 4267/CHE/2013

(51) Int. Cl.

| | |
|---|---|
| *G06F 9/45* | (2006.01) |
| *G06F 9/44* | (2006.01) |
| *G06F 9/445* | (2006.01) |
| *G06F 17/30* | (2006.01) |
| *G06F 13/10* | (2006.01) |

(52) U.S. Cl.
CPC .. *G06F 8/30* (2013.01); *G06F 8/36* (2013.01); *G06F 8/71* (2013.01); *G06F 9/4411* (2013.01); *G06F 9/44505* (2013.01); *G06F 13/102* (2013.01); *G06F 17/30386* (2013.01)

(58) Field of Classification Search
CPC ............ G06F 8/35; G06F 9/30; G06F 13/102
See application file for complete search history.

(56) References Cited

U.S. PATENT DOCUMENTS

| 7,904,878 | B2 * | 3/2011 | Kolathur | G06F 8/30 717/104 |
|---|---|---|---|---|
| 2004/0226024 | A1 * | 11/2004 | Rosenbloom | G06F 13/102 719/321 |
| 2008/0155572 | A1 * | 6/2008 | Kolathur | G06F 8/76 719/327 |
| 2009/0063718 | A1 * | 3/2009 | Sekine | G06F 9/4411 710/8 |
| 2009/0064196 | A1 * | 3/2009 | Richardson | G06F 8/36 719/327 |
| 2013/0326275 | A1 * | 12/2013 | Gururaj | G06F 11/263 714/33 |

* cited by examiner

*Primary Examiner* — Brian W Wathen
(74) *Attorney, Agent, or Firm* — The Law Office of Austin Bonderer, PC; Austin Bonderer

(57) ABSTRACT

A system for generating a device driver based on an archived template code using a device driver generation tool is provided. The device driver generation tool is configured to extract configuration files and template files from a template archive stored in a database, each of the files comprises high level configuration files and low level configuration files, each comprising one or more labels, parse a high-level configuration file, corresponding to a class of a device, and an operating system for which the driver is being generated, process a label from the high-level configuration file, extract template code from the template files to obtain an extracted template code, and generate a portion of the driver based on the extracted template code when a block label is identified, parse a low-level configuration file, and generate the driver using a first specification and a second specification when the label is a file label.

10 Claims, 9 Drawing Sheets

SYSTEM AND METHOD FOR GENERATING A DEVICE DRIVER USING AN ARCHIVE OF TEMPLATE CODE

BACKGROUND

1. Technical Field

The embodiments herein generally relate to a device driver generation systems, and, more particularly, to a system and method for generating a device driver using an archive of template code.

2. Description of the Related Art

A hardware system typically includes multiple functional units with sets of such units connected to each other using a common interconnect (termed as a bus-fabric). A system can have multiple inter-connected bus-systems designed to achieve variety of functionalities/objectives. As of now the only way for synthesizing device driver code for a device is to dump a code as an output using print statements in a tool. All the device driver code synthesis was being done in the tool. This meant that all the driver code, whether it was specific to a particular device or specific to an operating system framework for a device class, is getting synthesized using fprintf( ) calls in the tool. The problem with such an approach is that any change in the framework or addition of any new framework needs recoding the tool and recompiling it. Further, in case there are any bugs in the synthesized code, even a missing semi colon meant changing the tool and recompiling it. This proved to be very cumbersome and time consuming. Accordingly there remains a need for a system and method to generate a code that pertains to a driver framework provided by an operating system for a specific device class.

SUMMARY

In view of the foregoing, an embodiment herein provides a processor implemented method for generating a device driver based on an archived template code using a device driver generation tool, wherein the device driver generation tool comprises a database that stores (i) a template archive comprising a plurality of configuration files and a plurality of template files, (ii) a set of predefined rules, (iii) a first specification and (iv) a second specification for generating the device driver specific to a hardware device and an operating system, the processor implemented method comprising: (i) performing a first set of instructions comprising: extracting the plurality of configuration files and the plurality of template files from the template archive stored in the database, wherein the plurality of configuration files comprises one or more high level configuration files and one or more low level configuration files, wherein the one or more low level configuration files and the one or more high level configuration files comprises one or more labels; parsing at least one high-level configuration file from the one or more high level configuration files, corresponding to a class of the hardware device, and the operating system for which the device driver is being generated; simultaneously processing at least one label associated with the at least one high-level configuration file to obtain an identified label; (ii) performing (a) a second set of instructions when the identified label is a block label, or (b) a third set of instructions when the identified label is a file label, wherein the second set of instructions comprises: extracting template code from the plurality of template files for the block label to obtain an extracted template code; and generating a portion of the device driver corresponding to the block label based on the extracted template code, wherein the third set of instructions comprises: parsing at least one low-level configuration file from the one or more low-level configuration files; and generating the device driver using the first specification and the second specification based on the at least one low-level configuration file.

The processor implemented method may further comprise processing the extracted template code to identify a tag in the extracted template code; when the tag is a customization tag, synthesizing at least a portion of the extracted template code specific to the customization tag based on the first specification to obtain a synthesized code; and generating a portion of the device driver based on the synthesized code to an output file using at least one predefined rule stored in the database.

The processor implemented method may further comprise processing an input from a user to modify (i) a template code from the portion of the device driver to obtain a modified file, wherein the modified file comprises (i) the extracted template code, and (ii) at least one start marker and at least one end marker that indicate modifications done to the portion of the device driver; updating the plurality of template files based on the modified file to obtain a plurality of updated template files; and generating an updated device driver based on the plurality of updated template files for another hardware device, wherein the updated device driver comprises one or more set of codes that represent the plurality of updated template files, wherein the one or more set of codes comprises the extracted template code and a user modified code from the modified file.

In another embodiment, a system for generating a device driver based on an archived template code using a device driver generation tool is provided. The system comprising: one or more hardware processors; a memory storing instructions to configure the one or more hardware processors, wherein the one or more hardware processors are configured by the instructions to execute the device driver generation tool on the system, wherein the device driver generation tool when executed by the one or more hardware processors generates the device driver based on the archived template code, wherein the device driver generation tool comprises a database that stores (i) a template archive comprising a plurality of configuration files and a plurality of template files, (ii) a set of predefined rules, (iii) a first specification and (iv) a second specification for generating the device driver specific to a hardware device and an operating system, wherein the device driver generation tool when executed by the one or more hardware processors is configured to (i) perform a first set of instructions comprising: extracting the plurality of configuration files and the plurality of template files from a template archive stored in the database, wherein the plurality of configuration files comprises one or more high level configuration files and one or more low level configuration files, wherein the one or more low level configuration files and the one or more high level configuration files comprises one or more labels; parsing at least one high-level configuration file from the one or more high level configuration files, corresponding to a class of the hardware device, and the operating system for which the device driver is being generated; simultaneously processing at least one label associated with the at least one high-level configuration file to obtain an identified label; (ii) perform (a) a second set of instructions when the identified label is a block label, or (b) a third set of instructions when the identified label is a file label, wherein the second set of instructions comprises: extracting template code from the plurality of template files for the block label to obtain an extracted template code; and generating a portion of the device driver corresponding to the block label based on the extracted template code, wherein the third set of instructions comprises: parsing at least one low-level configuration file from the one or more low-level configuration files; and generating the device driver using the first specification and the second specification based on the at least one low-level configuration file.

The device driver generation tool when executed by the one or more hardware processors is configured to process the extracted template code to identify a tag in the extracted template code. When the tag is a customization tag, the device driver generation tool is configured to synthesize a portion of the extracted template code specific to the customization tag based on the first specification to obtain a synthesized code; and generate a portion of the device driver based on the synthesized code to an output file using at least one predefined rule stored in the database.

The device driver generation tool when executed by the one or more hardware processors is further configured to process an input from a user to modify (i) a template code from the portion of the device driver to obtain a modified file, wherein the modified file comprises (i) the extracted template code, and (ii) at least one start marker and at least one end marker that indicate modifications done to the portion of the device driver. The device driver generation tool when executed by the one or more hardware processors is further configured to update the plurality of template files based on the modified file to obtain a plurality of updated template files, and generate an updated device driver based on the plurality of updated template files for another hardware device, wherein the updated device driver comprises one or more set of codes that represent the plurality of updated template files, and wherein the one or more set of codes comprises the extracted template code and a user modified code from the modified file.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
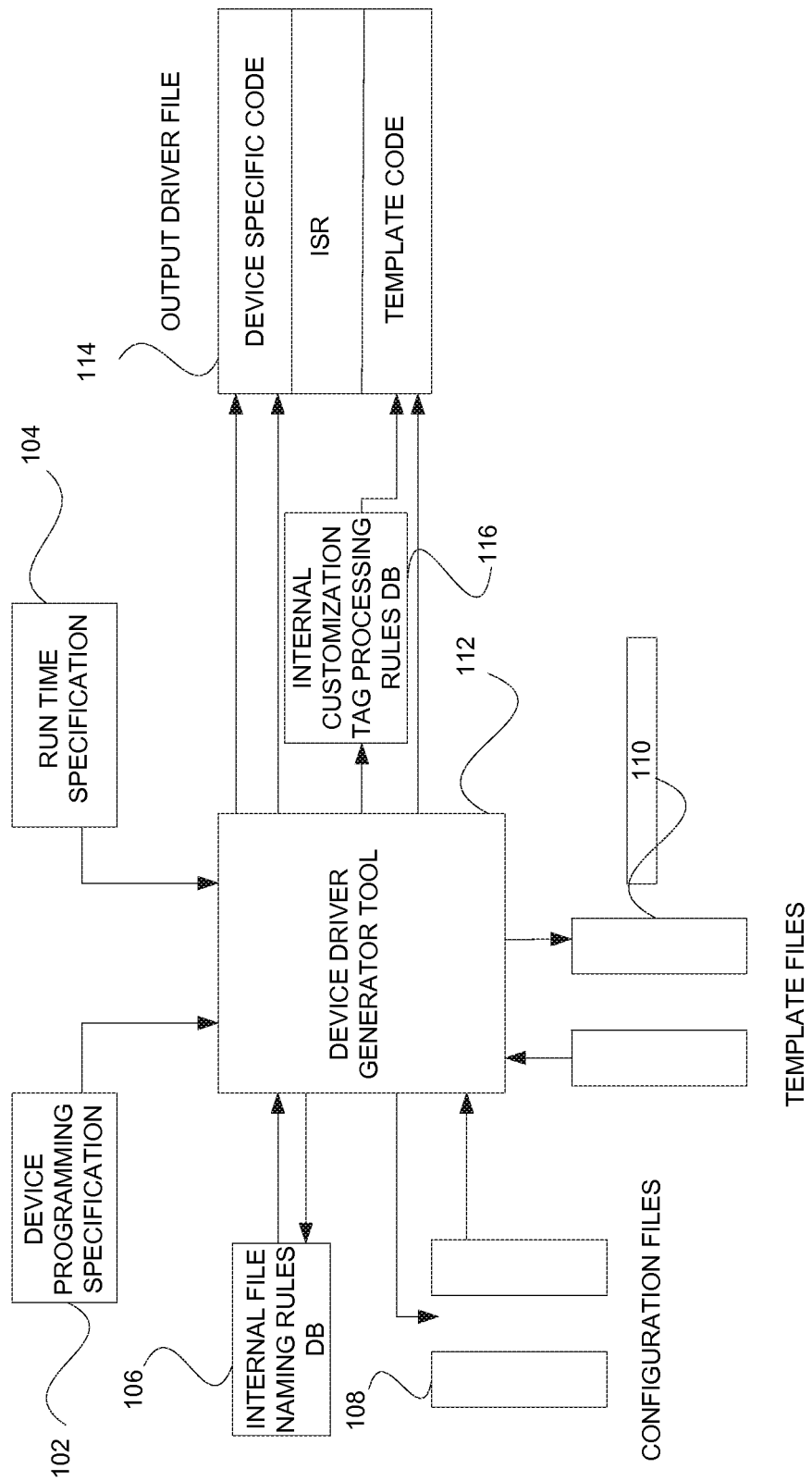
FIG. 1 illustrates a system view for generating a device driver code using template driver code according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method to generate a code that pertains to a driver framework provided by an operating system for a specific device class. The embodiments herein achieve this by providing a code that is device specific that takes care of all the nuances of implementing device features of a particular device that include writing or reading device registers in a particular sequence, handling device interrupts as required whenever they occur etc. Referring now to the drawings, and more particularly to FIGS. 1 through 6, where similar reference characters denote corresponding features consistently throughout the figures, there are shown preferred embodiments.

Configuration file: A configuration file is a file containing a sequence of labels. These labels comprise XML tags and notify (or indicate) the device driver generation tool the sequence in which different blocks of template code has to be dumped in the output driver code that is being generated.

The names of configuration files are rules based. These rules are specified in rules.txt file.

Template code: Device driver code can be viewed as consisting of two more or less distinct parts. One part is dependent on an operating system driver framework for a specific device class (a device class but not limited to, such as Ethernet, USB peripheral, USB host, etc) and the other part is completely dependent on the specific device (a specific device belonging to a particular device class, such as Intel 82567 Ethernet card). Part of code that is an operating system driver framework dependent will remain more or less unchanged irrespective of the hardware device for which a device driver is being generated. Such code is referred to as template code.

The template code may comprise a set of codes (e.g., or a set of instructions) that are dependent of a specific hardware device for which device driver is being generated. Such device dependent code appearing as part of the template code is represented in template code using customization tags.

Label: A label may appear as part of a configuration file or as part of template code. The labels that appear in configuration files can either be a block label or a file label. All labels will be XML tags.

Block label: A block label in a configuration file represents a block of template code. All block labels and corresponding blocks of code will be defined in template code files. A block label may be expanded to one or more complete functions in C or just a single line of code that will be part of a C function.

File label: A file label will appear only in a configuration file and represents another configuration file to be parsed rather than a block of code.

Rules.txt: The rules.txt file comprises one or more predefined rules that notify the device driver generation tool how to form the names of various configuration files that are used while generating device driver code.

Customization tags: A customization tag is used in a template code block whenever a device specific code has to be generated as part of the template code block. Customization tags will appear in template code enclosed between special characters—'@ at the start and @' at the end.

FIG. 1 is a system view 100 illustrating a method for generating a device driver code using template driver code according to an embodiment herein. The system view 100 includes a device programming specification 102, a run time specification 104, an internal file naming rules database 106, configuration files 108, a set of template files 110, a device driver generation tool 112, an output driver file 114 and an internal customization tag processing rules database 116. The method for generating a device driver code using template driver code is executed on a processor implemented system comprising one or more hardware processors, a memory storing instructions to configure the one or more hardware processors. The processor implemented system may comprise any of a computer system such as a personal computer, a laptop, a smartphone, a tablet PC, or a computing system that is capable of archiving template codes into a template archive and generating a device driver using an archived template code. The one or more hardware processors are configured by the instructions to execute the device driver generation tool 112 on the processor implemented system. The device driver generation tool 112 when executed by the one or more hardware processors generates a device driver based on an archived template code. The device driver generation tool 112 comprises a database that stores (i) a template archive comprising a plurality of configuration files (e.g., the configuration files 108) and a plurality of template files (e.g., the set of template files 110), (ii) a set of predefined rules, (iii) a first specification comprising a hardware device specification (also referred to as a device program specification) and (iv) a second specification comprising a software specification (also referred to as a run time specification) for generating the device driver specific to the hardware device and an operating system. One or more high level configuration files and one or more of low level configuration files are part of the configurations files 108 in an example embodiment. The configuration files 108 and template files 110 are extracted from the template archive (e.g., extracted in an encrypted form) by the device driver generation tool 112. The one or more low level configuration files and the one or more high level configuration files comprises one or more labels. The device driver generation tool 112 starts parsing the high-level configuration file, corresponding to a class of the hardware device and the operating system for which the device driver is being generated, which is part of the configuration files 108 and processes the various labels encountered in the high level configuration file (which is part of configuration files 108) as follows (i) when device driver generation tool 112 encounters a file label it starts processing the low-level configuration file 108 (which is part of the configuration files 108) corresponding to that file label (ii) when a block label is encountered, the device driver generation tool 112 searches for that block label in all the template files 110 and extracts a template code block corresponding to the block label. As way of clarity, the device driver generation tool 112 parses at least one high-level configuration file from the one or more high level configuration files, corresponding to a class of the hardware device, and the operating system for which the device driver is being generated. The device driver generation tool 112 simultaneously processes at least one label associated with the at least one high-level configuration file to obtain an identified label. Further, when the identified label is a block label, the device driver generation tool 112 (i) extracts template code from the plurality of template files for the block label (e.g., an identified block label) to obtain an extracted template code, and (ii) generates a portion of the device driver corresponding to the block label based on the extracted template code. During this process, the device driver generation tool 112 also checks whether there are any duplicates of block labels. If there are any duplicates of block labels, they are removed (or deleted). Likewise, when the identified label is a file label, the device driver generation tool 112 (i) parses at least one low-level configuration file from the one or more low-level configuration files, and (ii) generates the device driver using the first specification and the second specification based on the at least one low-level configuration file. The device driver generation tool 112 proceeds to dump the template code as an output till it encounters any customization labels. The code that corresponds to any customization label is synthesized using rules in an internal customization tag processing rules database 106 and dumped as an output. This processing is continued till the device driver generation tool 112 reaches the end of the high-level configuration file, which is part of the configuration files 108.

High-Level Configuration File Example

```
linux_network.xml
<xml>
<file_label>
ethtool_ops
</file_label>
<file_label>
probe
</file_label>
<file_label>
remove
</file_label>
<file_label>
open
</file_label>
<file_label>
close
</file_label>
<file_label>
linux_network_set_rx_mode
</file_label>
<file_label>
function_ptrs
</file_label>
<file_label>
private_data_structure
</file_label>
<file_label>
descriptor_buffer_alloc
</file_label>
<file_label>
tx_desc_init
</file_label>
<file_label>
rx_desc_init
</file_label>
<file_label>
```

```
                free_tx_buffer_desc_mem
            </file_label>
            <file_label>
                free_rx_buffer_desc_mem
            </file_label>
            <file_label>
                linux_network_tx
            </file_label>
            <file_label>
                eth_re_alloc_skb
            </file_label>
            <file_label>
                linux_network_rx
            </file_label>
            <file_label>
                platform_driver
            </file_label>
    </xml>
```

Low-Level Configuration File Example

```
linux_2629_network_pcimm.xml
<xml>
<block_label>
e_LINUX_PCI_DRV_FUNC_PROTOTYPES
</block_label>
<block_label>
e_LINUX_PCI_DRV_STRUCT
</block_label>
<block_label>
e_LINUX_PCI_DRV_SHUTDOWN
</block_label>
<block_label>
e_LINUX_PCI_DRV_SUSPEND
</block_label>
<block_label>
e_LINUX_PCI_DRV_SUSPEND_LATE
</block_label>
<block_label>
e_LINUX_PCI_DRV_RESUME
</block_label>
<block_label>
e_LINUX_PCI_DRV_RESUME_EARLY
</block_label>
<!--
platform_driver structure initialization
-->
<block_label>
e_DOXYGEN_COMMENTS_FOR_LINUX_PCI_INIT_MODULE_FUNC
</block_label>
<block_label>
e_LINUX_PCI_INIT_MODULE
</block_label>
<block_label>
e_DOXYGEN_COMMENTS_FOR_LINUX_PCI_EXIT_MODULE_FUNC
</block_label>
<block_label>
e_LINUX_PCI_EXIT_MODULE
</block_label>
<block_label>
e_LINUX_MODULE_INIT_EXIT
</block_label>
</xml>
```

Template Code Example with Block Labels and Customization Tags

```
<e_LINUX_PROBE_PCI_BLOCK1 file="yoswrap.c">
<![CDATA[
DBGPR ("--> '@device_name@'_probe\n");
'@get_device_clock@'
ret = pci_enable_device (pdev);
if (ret) {
printk (KERN_ALERT
"%s:Unable to enable device\n",DEV_NAME);
goto err_out_enb_failed;
}
if (pci_request_regions (pdev, DEV_NAME)) {
printk (KERN_ALERT
"%s:Failed to get PCI regions\n",DEV_NAME);
ret = -ENODEV;
goto err_out_req_reg_failed;
}
'@bus_mastering@'
]]>
</e_LINUX_PROBE_PCI_BLOCK1>
```

When the tool 112 is processing the sample template block of code shown above, it will dump the code that is appearing as part of the XML comment when it encounters the block label e_LINUX_PROBE_PCI_BLOC1 in a configuration file. In the process of dumping, the three customization tags that are present in the template code—'@device_name@', '@get_device_clock@' and '@bus_mastering@'—will be processed using the internal tag processing rules database and the corresponding output code will get dumped.

Corresponding to the '@device_name@' the device name that is specified in DPS will be dumped (unless changed on command line).

Corresponding to the '@get_device_clock@', any function name that is specified in RTS for it will get dumped or else if there is no specification in RTS, a default macro, GET_CLOCK( )prefixed with the device name specified in the DPS will be dumped.

Corresponding to '@bus_mastering@', tool will dump appropriate code based on three specifications; the Operating System, the device interconnect and mode of data transfer. For example, if the Operating System has been specified as Linux and the device interconnect has been specified as PCI (or PCIe) and the data transfer mode has been specified as DMA, the tool will dump the Linux Kernel API pci_set_master( ) as output.

Similarly there are various rules in the internal rules database that will be used for processing all the customization tags present in a block template code.

Figure 2A:
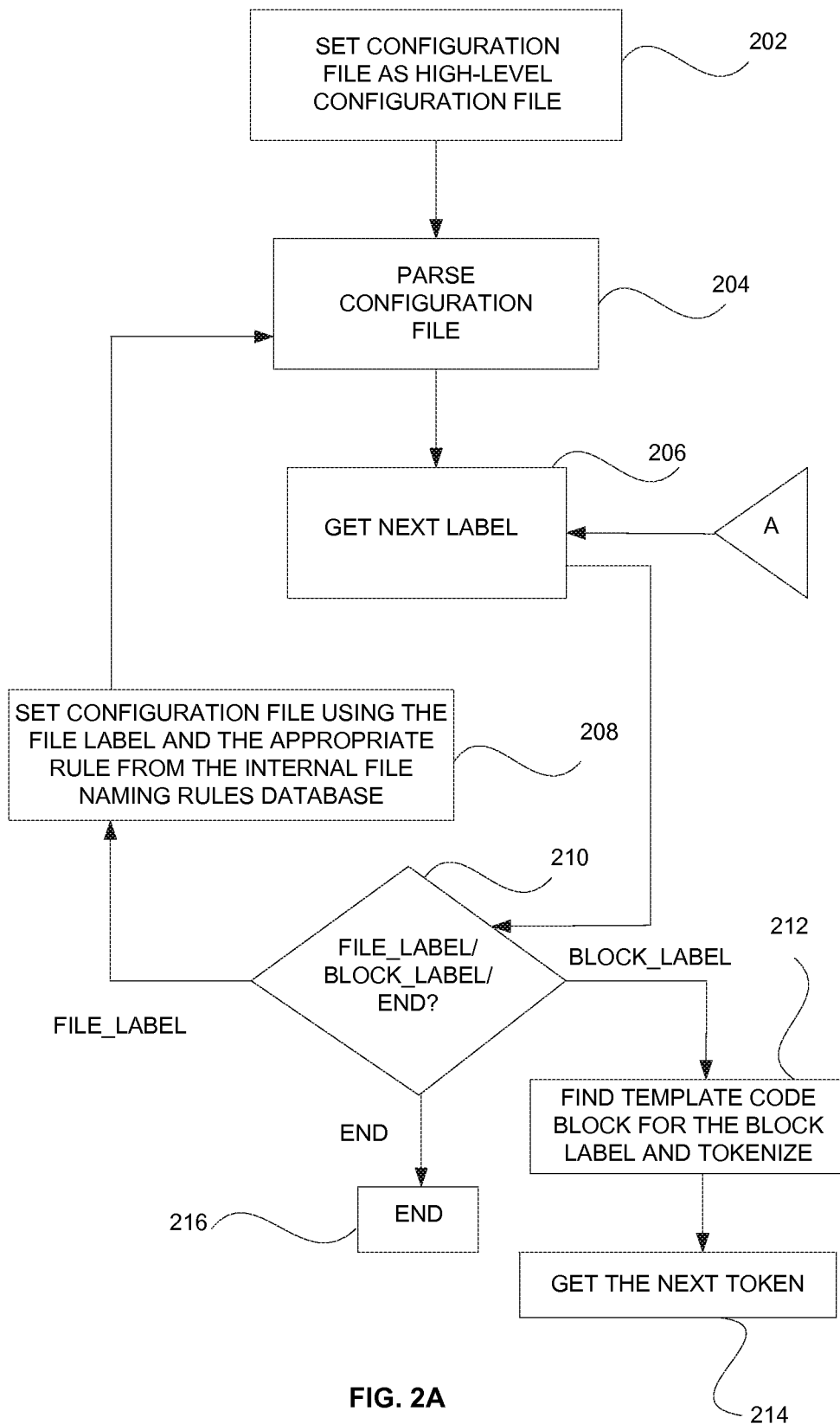
FIG. 2A is a flow diagram illustrates generating a device driver code using template driver code generation according to an embodiment herein.

FIG. 2A is a flow diagram that illustrates generating a device driver code using template driver code according to an embodiment herein. In step 202 of FIG. 2A a configuration file is set as a high-level configuration file. In step 204 the said configuration file, which is part of configuration files 108 of FIG. 1 is parsed to collect all the labels. In step 206 a next label is obtained. The step 206 is accessed from two different points in the flow chart—once whenever a new configuration file is parsed and once when the processing the current label has been completed. In step 208, the configuration file to be processed is updated to a low-level configuration file, which is part of the configuration files 108 using the file label and the appropriate rule from the internal file naming rules database 106. In step 210 a check for file label or block label is performed. In step 212 a template code block for the block label is found and the code block is tokenized. In step 214 the next token is obtained.

Figure 2B:
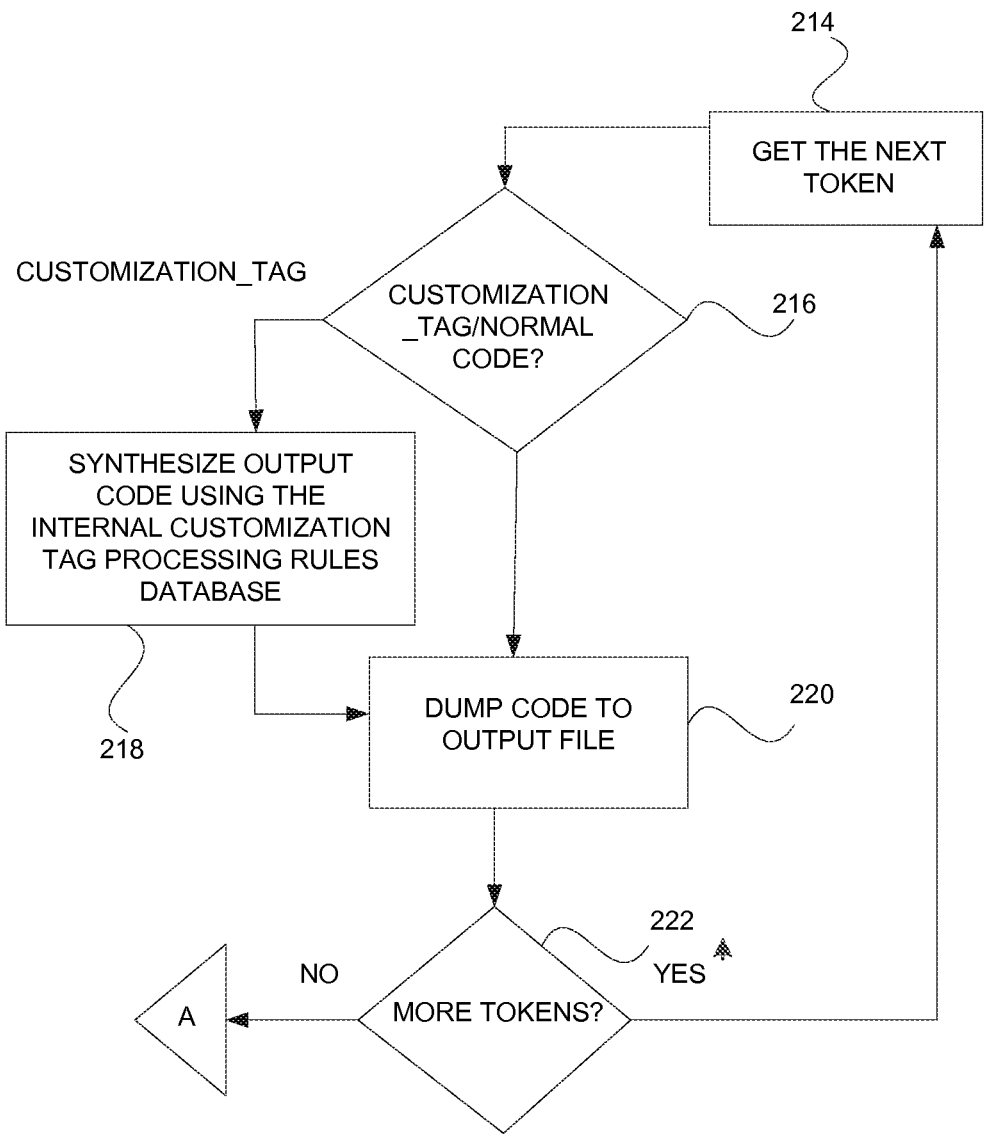
FIG. 2B is a flow diagram illustrates generating a device driver code using template driver code according to an embodiment herein.

FIG. 2B is a flow diagram that illustrates generating a template driver code according to an embodiment herein. In step 216 it is checked to see whether the token being processed is a customization tag or normal template code and appropriate actions are taken. If the token is a customization tag, in step 218 an output code is synthesized using the internal customization tag processing rules database 116 and the synthesized code is dumped to the output file. In step 220 the template code is dumped to the output file. In step 222 a check for more tokens is performed. As way of clarity, the device driver generation tool 112 when executed by the one or more hardware processors is further configured to process the extracted template code to identify a tag in the extracted template code. When the tag is a customization tag, the device driver generation tool 112 (i) synthesizes a portion of the extracted template code specific to the customization tag based on the first specification to obtain a synthesized code, and (ii) generates a portion of the device driver based on the synthesized code to an output file using at least one predefined rule from the set of predefined rules stored in the database. The at least one rule may be fetched from the internal file naming rules database 106 and applied to generate the portion of the device driver using (or based on) the synthesized code. The extracted template code may comprise one or more other tags different from the customization tag, in an example embodiment.

Figure 3A:
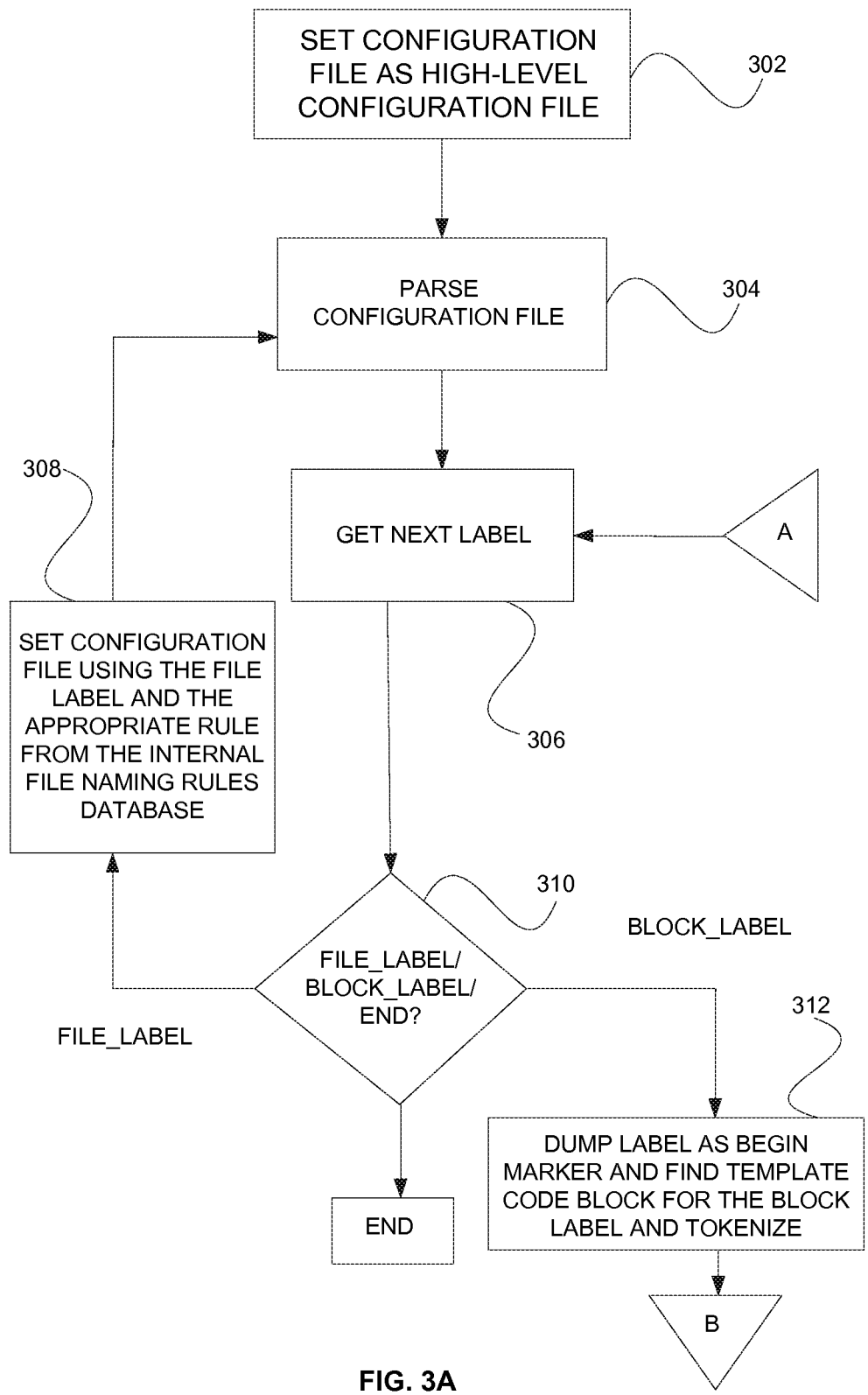
FIG. 3A is a flow diagram illustrating the functioning of the device driver generation tool that generates a driver with markers indicating a beginning and an end of a code corresponding to each block label according to an embodiment herein.

FIG. 3A is a flow diagram that illustrates generating a device driver with markers indicating a beginning and an end of a code corresponding to each block label according to an embodiment herein. In step 302, a configuration file is set as a high-level configuration file that is part of configuration files 108. In step 304, the configuration file that was set in 302 is parsed to collect all the labels. In step 306, next label is obtained. The step 306 is accessed from two different points in the flow chart—once whenever a new configuration file is parsed and once when processing the current label has been completed. In step 308, the configuration file to be processed is set to a low level configuration file that is part of the configuration files 108 is set using the file label and the appropriate rule from the internal file naming rules database 106. In step 310, a check for file label or block label is performed. In step 312, the current block label is dumped as begin marker, and the template code block for the block label is found and is tokenized.

Figure 3B:
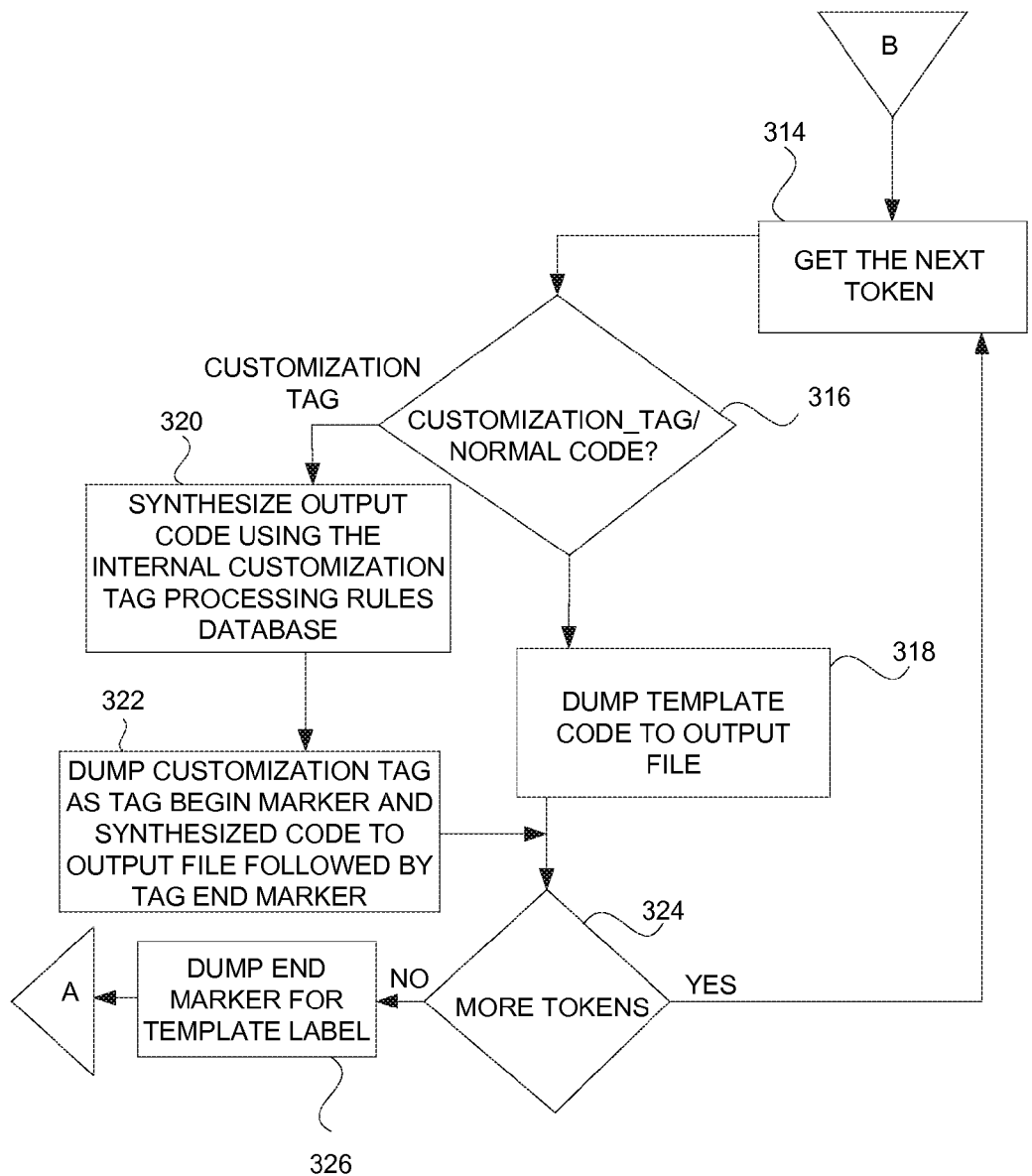
FIG. 3B is a flow diagram illustrating the functioning of the device driver generation tool that generates a driver with markers indicating a beginning and an end of a code corresponding to each block label according to an embodiment herein.

FIG. 3B is a flow diagram that illustrates generating a device driver with markers indicating a beginning and an end of a code corresponding to each block label according to an embodiment herein. In step 314, a next token is obtained. In step 316, it is checked to see whether the token being processed is a customization tag or template code. If it is normal template code, in step 318, the template code is dumped to the output file. In step 320, output code is synthesized using the internal customization tag processing rules database 116. In step 322 the current customization tag is dumped as a tag begin marker, along with the output code to the output file followed by a tag end marker. In step 324, a check for more tokens is performed. In step 326, end marker is dumped for the block label.

Figure 4A:
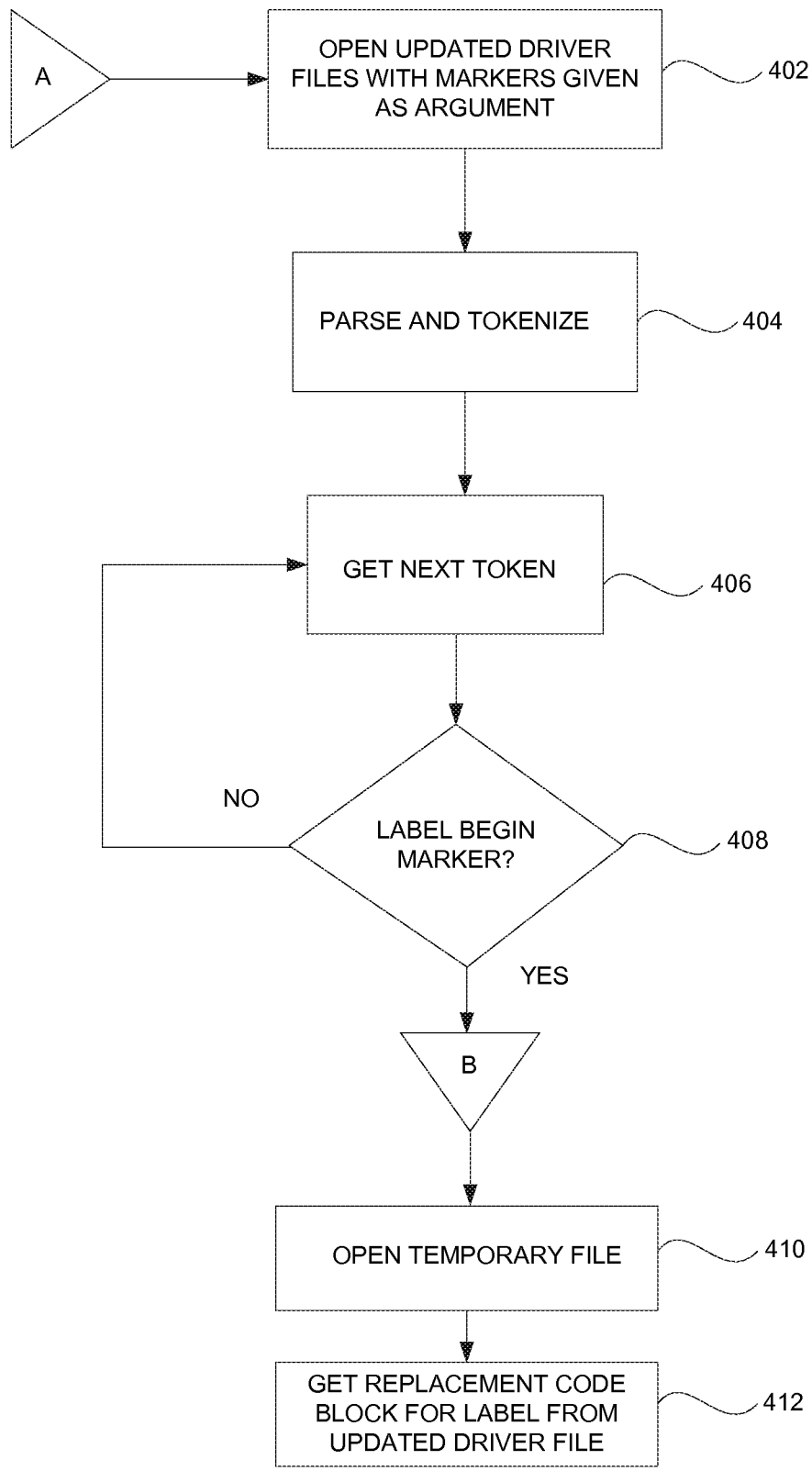
FIG. 4A is a flow diagram illustrating the functioning of the device driver generation tool that is executed using a command line option to update a template archive by generating a modified driver file with markers as an argument according to an embodiment herein.

FIG. 4A is a flow diagram illustrating the execution of device driver generation tool when executed using a command line option to update a template archive by using a modified driver file with markers, generated as per FIG. 3A/3B, as an argument according to an embodiment herein. In step 402, updated driver files along with the markers are given as arguments is opened. In step 404, the updated driver files are parsed and tokenized. In step 406 next token is obtained. In step 408, a check for label begin marker is performed. The step 408 is accessed from two different points in the flow chart—once whenever a new configuration file is parsed and once when the processing the current label has been completed. In step 410, a new temporary file is opened. In step 412, the replacement code block for label from updated driver file is obtained.

Figure 4B:
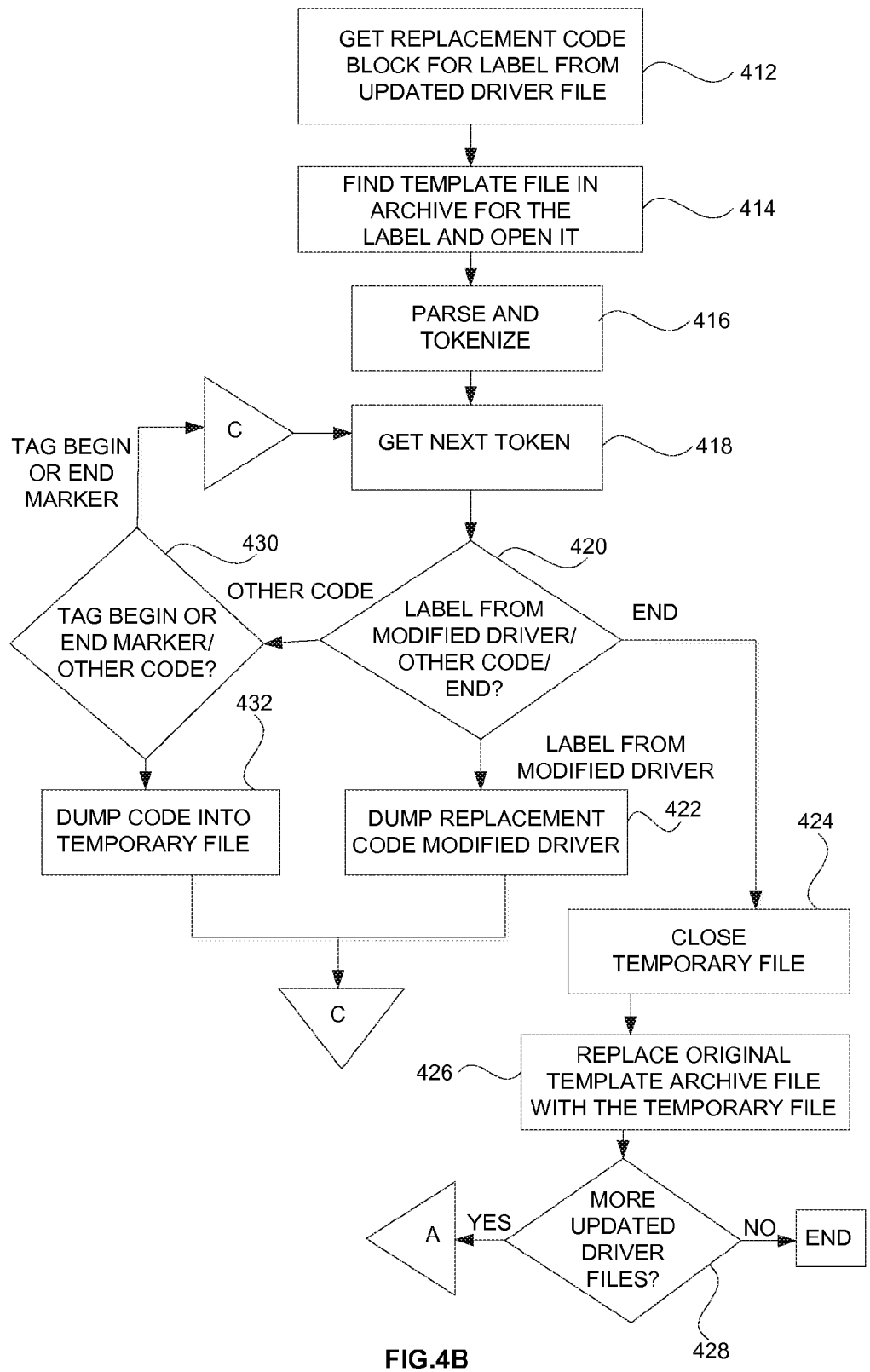
FIG. 4B is a flow diagram illustrating the functioning of the device driver generation tool that is executed using a command line option to update a template archive by generating a modified driver file with markers as an argument according to an embodiment herein.

FIG. 4B is a flow diagram illustrating the execution of the device driver generation tool when executed using a command line option to update a template archive by using a modified driver file with markers, generated as per FIG. 3A/3B as an argument according to an embodiment herein. In step 412, the replacement code for the block label is got from the modified driver file received as argument to the tool. In step 414, the template file in archive for the block label is found and opened. In step 416, the template file in archive for the label is parsed and tokenized. In step 418, a next token is obtained. In step 420, a check is done to determine whether it is the block label corresponding to the modified code. If it is, in step 422, a replacement code modified driver is dumped into the temporary file. Otherwise, in step 430, if it is not tag begin or end marker, the token is dumped into the temporary file. In step 424, the temporary file is closed. In step 426, in the original template archive, the template file corresponding to the updated block label code is replaced with the temporary file. In step 428, a check for more updated driver files is performed. In step 430, check for beginning tag or end marker or other code is performed. In step 432, code is dumped into temporary file. Assuming that the user has tested the device driver code, and a portion of the device driver code (e.g., a template block of the device driver code) requires a modification, an example for a small modification is illustrated below:

Template block of driver code that needs a small change

---

```
static int NEW_NIC_ETH_open (struct net_device *dev)
{
struct NEW_NIC_ETH_prv_data *pdata = NULL;
```

-continued

```
int ret = Y_SUCCESS;
DBGPR("-->NEW_NIC_ETH_open\n");
pdata = netdev_priv (dev);
/*set the operating modes based on the result of auto-negotiation*/
ret = NEW_NIC_ETH_check_phy_capability(dev);
if(ret) {
    goto err_irq_0;
}
pdata->irq_number = dev->irq;
ret = request_irq(pdata->irq_number,
        NEW_NIC_ETH_ISR_SW_NEW_NIC_ETH,
        IRQF_SHARED, DEV_NAME, pdata);
if(ret != 0) {
    printk(KERN_ALERT "Unable to register IRQ %d\n",
        pdata->irq_number);
    ret = -EBUSY;
    goto err_irq_0;
}
NEW_NIC_ETH_yinit( );
if ((ret = allocate_buffer_and_desc (pdata)) < 0) {
    printk (
    KERN_ALERT "failed to allocate buffer/descriptor memory\n");
    free_irq(pdata->irq_number, pdata);
    return ret;
}
pdata->cur_tx = 0;
pdata->queue_stopped = 0;
napi_enable (&(pdata->napi));
NEW_NIC_ETH_set_rx_mode (dev);
tx_descriptor_init (pdata);
rx_descriptor_init (pdata);
netif_start_queue (dev);
DBGPR("<--NEW_NIC_ETH_open\n");
return ret;
err_irq_0 :
return ret;
```

With reference to FIGS. 4A-4B, as way of clarity, when one or more markers are given as arguments for an updated device driver, the device driver generation tool 112 when executed by the one or more hardware processors is further configured to process an input from a user to modify (i) a template code from the portion of the device driver to obtain a modified file. The modified file comprises (i) the extracted template code, and (ii) at least one start marker and at least one end marker that indicate modifications done to the portion of the device driver. The modified file may comprise a customization tag.

Modified Template Block of Code

```
static int NEW_NIC_ETH_open (struct net_device *dev)
{
 struct NEW_NIC_ETH_prv_data *pdata = NULL;
 int ret = Y_SUCCESS;
DBGPR("-->NEW_NIC_ETH_open\n");
 pdata = netdev_priv (dev);
/*set the operating modes based on the result of auto-negotiation*/
 ret = NEW_NIC_ETH_check_phy_capability(dev);
 if(ret) {
    goto err_irq_0;
 }
 pdata->irq_number = dev->irq;
 ret = request_irq(pdata->irq_number,
        NEW_NIC_ETH_ISR_SW_NEW_NIC_ETH,
        IRQF_SHARED, DEV_NAME, pdata);
 if(ret != 0) {
    printk(KERN_ALERT "Unable to register IRQ %d\n",
        pdata->irq_number);
    ret = -EBUSY;
    goto err_irq_0;
 }
 NEW_NIC_ETH_yinit( );
 if ((ret = allocate_buffer_and_desc (pdata)) < 0) {
    printk (
    KERN_ALERT "failed to allocate buffer/descriptor memory\n");
    free_irq(pdata->irq_number, pdata);
    return ret;
 }
 pdata->cur_tx = 0;
 pdata->dirty_tx = 0; /* Change required to be made */
 pdata->queue_stopped = 0;
 napi_enable (&(pdata->napi));
 NEW_NIC_ETH_set_rx_mode (dev);
 tx_descriptor_init (pdata);
 rx_descriptor_init (pdata);
 netif_start_queue (dev);
DBGPR("<--NEW_NIC_ETH_open\n");
 return ret;
err_irq_0 :
 return ret;
}
```

The modifications required to be made is highlighted above (e.g., pdata->dirty_tx=0). Upon the modifications made to the device driver code, the device driver generation tool 112 further (i) updates the plurality of template files 110 based on the modified file to obtain a plurality of updated template files, and (ii) generates an updated device driver based on the plurality of updated template files for another hardware device (e.g., a second hardware device). The second hardware device comprising a second operating system. The second operating system and the operating system for which the device driver is generated are identical, in a preferred embodiment. The updated device driver comprises one or more set of codes (e.g., template codes) that represent the plurality of updated template files. The one or more set of template codes comprises the extracted template code and a user modified code from the modified file. The user modified code comprises modifications to the template code from the portion of the device driver. It is to be understood to a person having ordinary skill in the art that template codes are different for different operating systems.

Relevant part of driver code generated when the device driver generation tool 112 is executed as mentioned in the above methodology:

```
/* <e_LINUX_ETH_OPEN_FUNC_DEF> */
static int '@device_name@'NEW_NIC_ETH@'_open (struct
net_device *dev)
{
 struct '@device_name@'NEW_NIC_ETH@'_prv_data *pdata =
 NULL;
 int ret = Y_SUCCESS;
DBGPR("-->NEW_NIC_ETH_open\n");
 pdata = netdev_priv (dev);
/*set the operating modes based on the result of auto-negotiation*/
 ret =
 '@device_name@'NEW_NIC_ETH@'_check_phy_capability(dev);
 if(ret) {
    goto err_irq_0;
 }
 pdata->irq_number = dev->irq;
 '@register_isr_handler@'ret = request_irq(pdata->irq_number,
        NEW_NIC_ETH_ISR_SW_NEW_NIC_ETH,
        IRQF_SHARED, DEV_NAME, pdata);
 if(ret != 0) {
    printk(KERN_ALERT "Unable to register IRQ %d\n",
        pdata->irq_number);
    ret = -EBUSY;
    goto err_irq_0;
 }@'
 '@device_name@'NEW_NIC_ETH@'_yinit( );
 '@register_write_to_set_rx_buff_size@'@'
 if ((ret = allocate_buffer_and_desc (pdata)) < 0) {
    printk (
```

```
    KERN_ALERT "failed to allocate buffer/descriptor memory\n");
      '@unregister_isr_handler@'free_irq(pdata->irq_number,
      pdata);@'
      return ret;
}
pdata->cur_tx = 0;
pdata->queue_stopped = 0;
'@napi_enable@'napi_enable (&(pdata->napi));@'
'@device_name@'NEW_NIC_ETH@'_set_rx_mode (dev);
tx_descriptor_init (pdata);
rx_descriptor_init (pdata);
netif_start_queue (dev);
DBGPR("<--NEW_NIC_ETH_open\n");
return ret;
'@irq_err_gotos@'err_irq_0 :
  return ret;
}
/* </e_LINUX_ETH_OPEN_FUNC_DEF> */
```

The marker code that was generated are indicated in the above code. The /* <e_LINUX_ETH_OPEN_FDNC_DEF>*/ and /* </e_LINUX_ETH_OPEN_FDNC_DEF>*/ are the template block label markers. The '@device_name@' . . . @', '@register_isr_handler@', '@register_write_to_set_rx_buff_size@'@', '@unregister_isr_handler@', '@napi_enable@', '@irq_err_gotos@' are the customization tag markers. The user modifies the code between the begin and end template label markers without making any changes to the code between customization tag markers.

Template code modified by user is illustrated by way of example below:

```
/* <e_LINUX_ETH_OPEN_FUNC_DEF> */
static int '@device_name@'NEW_NIC_ETH@'_open (struct
net_device *dev)
{
struct '@device_name@'NEW_NIC_ETH@'_prv_data *pdata =
NULL;
  int ret = Y_SUCCESS;
DBGPR("-->NEW_NIC_ETH_open\n");
  pdata = netdev_priv (dev);
/*set the operating modes based on the result of auto-negotiation*/
ret =
'@device_name@'NEW_NIC_ETH@'_check_phy_capability(dev);
if(ret) {
    goto err_irq_0;
}
pdata->irq_number = dev->irq;
'@register_isr_handler@'ret = request_irq(pdata->irq_number,
        NEW_NIC_ETH_ISR_SW_NEW_NIC_ETH,
        IRQF_SHARED, DEV_NAME, pdata);
if(ret != 0) {
    printk(KERN_ALERT "Unable to register IRQ %d\n",
    pdata->irq_number);
    ret = -EBUSY;
    goto err_irq_0;
}@'
'@device_name@'NEW_NIC_ETH@'_yinit( );
  '@register_write_to_set_rx_buff_size@'@'
if ((ret = allocate_buffer_and_desc (pdata)) < 0) {
    printk (
    KERN_ALERT "failed to allocate buffer/descriptor memory\n");
      '@unregister_isr_handler@'free_irq(pdata->irq_number,
      pdata);@'
      return ret;
}
pdata->cur_tx = 0;
pdata->dirty_tx = 0; /* Newly added to the driver with markers */
pdata->queue_stopped = 0;
'@napi_enable@'napi_enable (&(pdata->napi));@'
'@device_name@'NEW_NIC_ETH@'_set_rx_mode (dev);
tx_descriptor_init (pdata);
rx_descriptor_init (pdata);
netif_start_queue (dev);
DBGPR("<--NEW_NIC_ETH_open\n");
return ret;
'@irq_err_gotos@'err_irq_0 :
  return ret;@'
}
/* </e_LINUX_ETH_OPEN_FUNC_DEF> */
```

Figure 5:
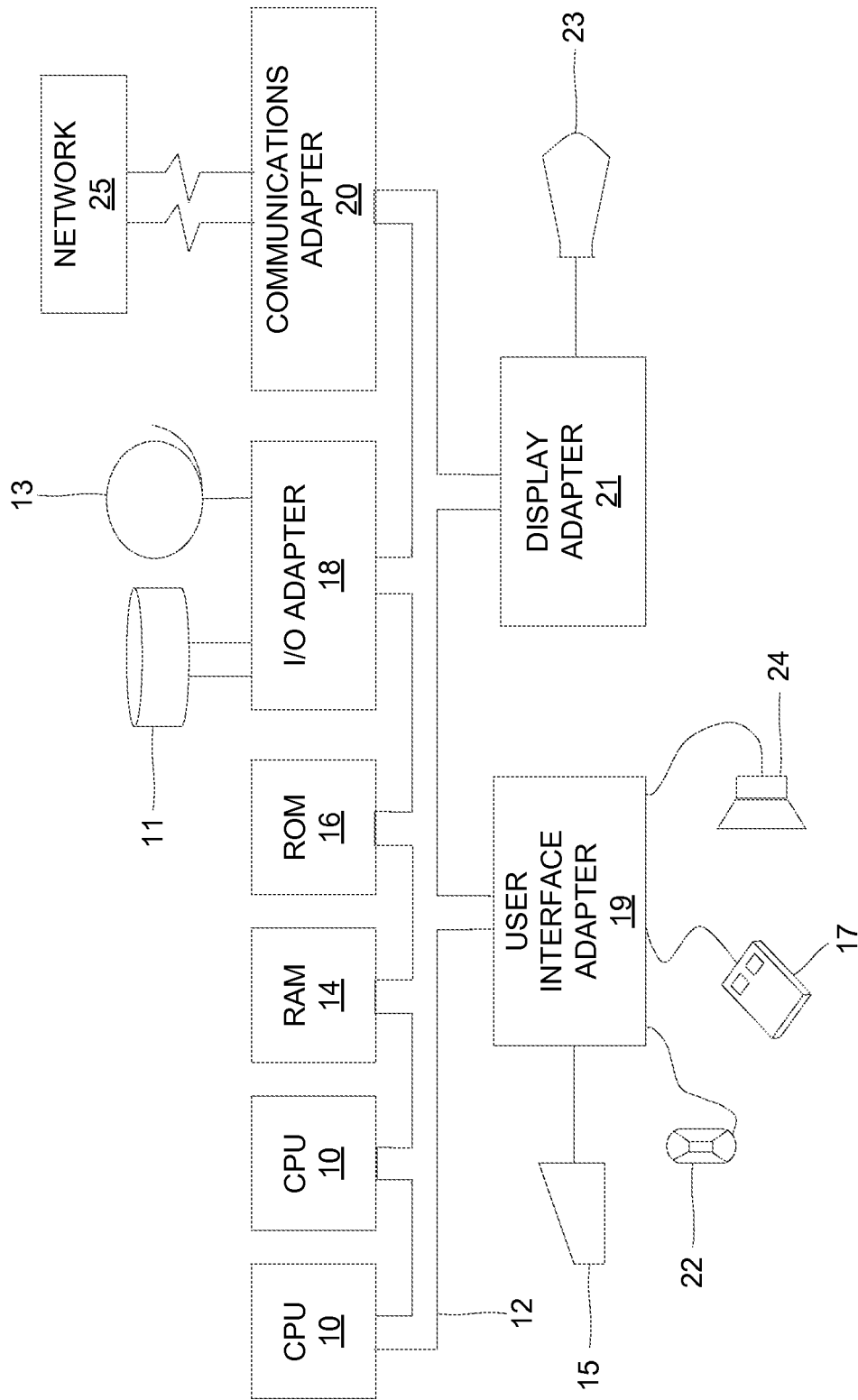
FIG. 5 illustrates a schematic diagram of a computer architecture used in accordance with the embodiment herein.

A representative hardware environment for practicing the embodiments herein is depicted in FIG. 5. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

If template files are not used during driver code generation, there will be fprintf( ) function calls in the tool to spew out the Operating system and device class specific code with most of the code being just string constants. If any changes are needed due to errors or driver enhancements, the tool will have to be modified and recompiled to make the changes. If the Operating system and device class specific code is kept outside the tool as template code, it becomes a simple job to edit the template files to make any changes. This also helps in adding support for new device classes or new Operating system frameworks. Use of block labels helps in reuse of code when adding support for different device under same Operating systems. Use of customization tags help in synthesizing code that is device specific or Operating system framework specific or device interconnect specific. Generation of driver code along with markers to indicate beginning and end of template code blocks and customization tag synthesized code helps in allowing the user to modify template code that has been generated as driver code. Further, running the tool with special option, providing modified template code helps the user in updating the template code in the archive so that the updated code will be used in future when the tool is used to generate the driver code for that particular device class. Providing special options to specify special options along a user id and the name of a folder containing configuration files and template files as arguments allows the user to add new template code to the template archive. Adding the new archive as a separate file and storing the name in the last created archive keeps each new archive independent of already existing archives.

Figure 6:
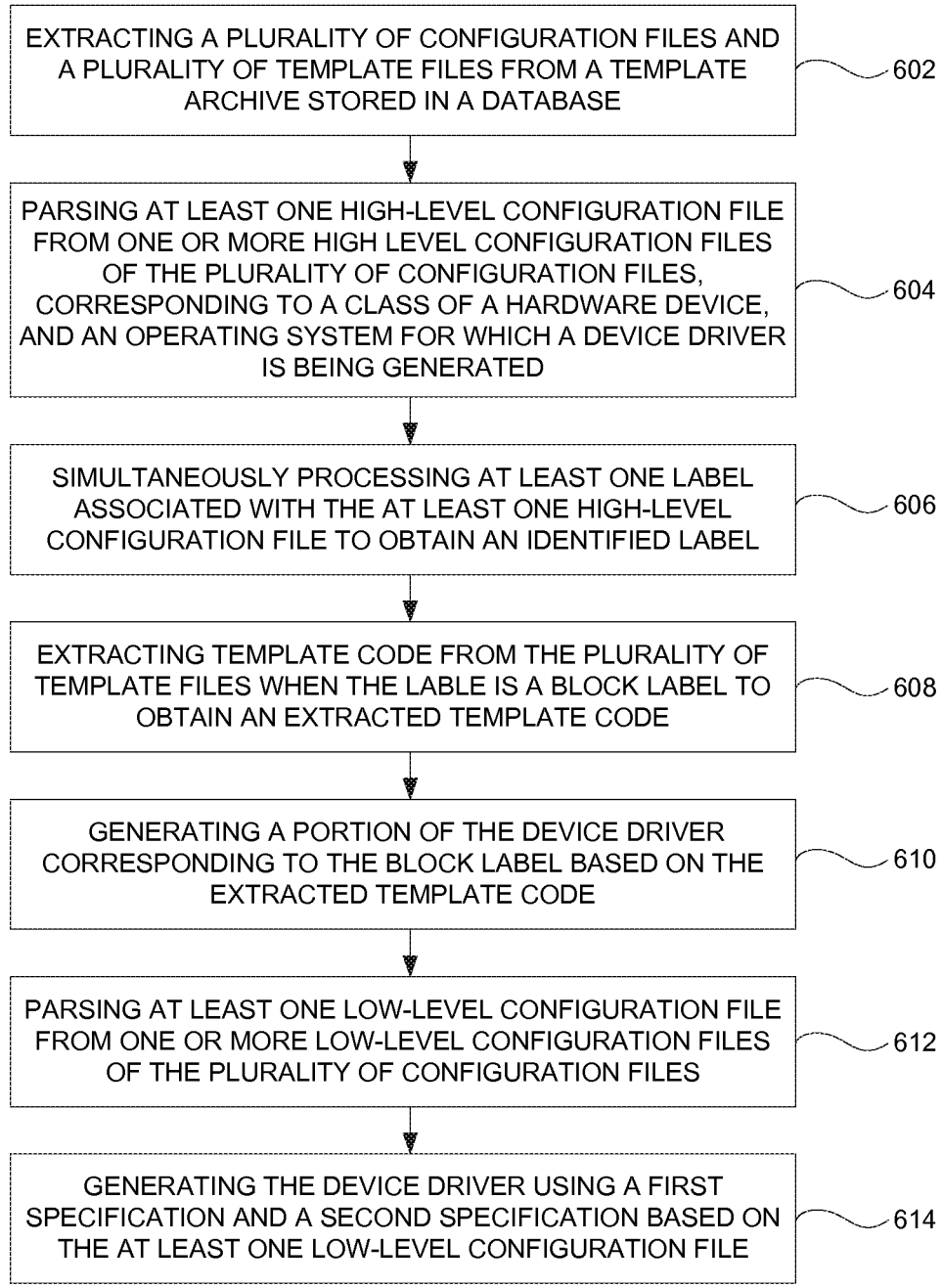
FIG. 6 is a flow diagram illustrating a processor implemented method for generating a device driver based on an archived template code using a device driver generation tool of FIG. 1 executed on a processor implemented system according to an embodiment herein.

FIG. 6, with reference to FIGS. 1 through 5, is a flow diagram illustrating a processor implemented method for generating a device driver based on an archived template code using the device driver generation tool 112 of FIG. 1 executed on the processor implemented system, wherein the device driver generation tool 112 comprises a database that stores (i) a template archive comprising a plurality of configuration files and a plurality of template files, (ii) a set of predefined rules, (iii) a first specification and (iv) a second specification for generating the device driver specific to a hardware device and an operating system, the processor implemented method comprising: extracting (602), the plurality of configuration files and the plurality of template files from the template archive stored in the database, wherein the plurality of configuration files comprises one or more high level configuration files and one or more low level configuration files, wherein each of the one or more low level configuration files and each of the one or more high level configuration files comprises one or more labels; parsing (604), at least one high-level configuration file from the one or more high level configuration files, corresponding to a class of the hardware device, and the operating system for which the device driver is being generated; simultaneously processing (606), at least one label associated with the at least one high-level configuration file to obtain an identified label; (ii) performing (a) a second set of instructions when the identified label is a block label, or (b) a third set of instructions when the identified label is a file label, wherein the second set of instructions comprises: extracting (608) template code from the plurality of template files for the block label to obtain an extracted template code; and generating (610), a portion of the device driver corresponding to the block label based on (or using) the extracted template code, wherein the third set of instructions comprises: parsing (612), at least one low-level configuration file from the one or more low-level configuration files; and generating (614), the device driver using the first specification and the second specification based on the at least one low-level configuration file.

The processor implemented method may further comprise: processing the extracted template code to identify a tag in the extracted template code; when the tag is a customization tag, synthesizing at least a portion of the extracted template code specific to the customization tag based on the first specification to obtain a synthesized code; and generating a portion of the device driver based on the synthesized code to an output file using at least one predefined rule stored in the database.

The processor implemented method may further comprise processing an input from a user to modify (i) a template code from the portion of the device driver to obtain a modified file, wherein the modified file comprises (i) the extracted template code, and (ii) at least one start marker and at least one end marker that indicate modifications done to the portion of the device driver; updating the plurality of template files based on the modified file to obtain a plurality of updated template files; generating an updated device driver based on the plurality of updated template files for another hardware device, wherein the updated device driver comprises one or more set of codes that represent the plurality of updated template files, wherein the one or more set of codes comprises the extracted template code and a user modified code from the modified file.

If template files are not used during driver code generation, there will be fprintf( ) function calls in the tool to spew out the Operating system and device class specific code with most of the code being just string constants. If any changes are needed due to errors or driver enhancements, the tool will have to be modified and recompiled to make the changes. If the Operating system and device class specific code is kept outside the tool as template code, it becomes a simple job to edit the template files to make any changes. This also helps in adding support for new device classes or new Operating system frameworks. Use of block labels helps in reuse of code when adding support for different device under same Operating systems. Use of customization tags help in synthesizing code that is device specific or Operating system framework specific or device interconnect specific. Generation of driver code along with markers to indicate beginning and end of template code blocks and customization tag synthesized code helps in allowing the user to modify template code that has been generated as driver code. Further, running the tool with special option, providing modified template code helps the user in updating the template code in the archive so that the updated code will be used in future when the tool is used to generate the driver code for that particular device class.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor implemented method for generating a device driver based on an archived template code using a device driver generation tool, wherein said device driver generation tool comprises a database that stores (i) a template archive comprising a plurality of configuration files and a plurality of template files, (ii) a set of predefined rules, (iii) a first specification and (iv) a second specification for generating said device driver specific to a hardware device and an operating system, said processor implemented method comprising:
(i) performing a first set of instructions comprising:
extracting said plurality of configuration files and said plurality of template files from said template archive stored in said database, wherein said plurality of configuration files comprises one or more high level configuration files and one or more low level configuration files, wherein said one or more low level configuration files and said one or more high level configuration files comprises one or more labels;
parsing at least one high-level configuration file from said one or more high level configuration files, corresponding to a class of said hardware device, and said operating system for which said device driver is being generated;
simultaneously processing at least one label associated with said at least one high-level configuration file to obtain an identified label;
(ii) performing (a) a second set of instructions when said identified label is a block label, or (b) a third set of instructions when said identified label is a file label, wherein said second set of instructions comprises:
extracting template code from said plurality of template files for said block label to obtain an extracted template code; and
generating a portion of said device driver corresponding to said block label based on said extracted template code, wherein said third set of instructions comprises:
parsing at least one low-level configuration file from said one or more low-level configuration files; and
generating said device driver using said first specification and said second specification based on said at least one low-level configuration file.

2. The processor implemented method of claim 1, further comprising processing said extracted template code to identify a tag in said extracted template code.

3. The processor implemented method of claim 2, further comprising when said tag is a customization tag,
synthesizing at least a portion of said extracted template code specific to said customization tag based on said first specification to obtain a synthesized code; and
generating a portion of said device driver based on said synthesized code to an output file using at least one predefined rule stored in said database.

4. The processor implemented method of claim 3, further comprising
processing an input from a user to modify (i) a template code from said portion of said device driver to obtain a modified file,
wherein said modified file comprises (i) said extracted template code, and (ii) at least one start marker and at least one end marker that indicate modifications done to said portion of said device driver;
updating said plurality of template files based on said modified file to obtain a plurality of updated template files; and
generating an updated device driver based on said plurality of updated template files for another hardware device, wherein said updated device driver comprises one or more set of codes that represent said plurality of updated template files, wherein said one or more set of codes comprises said extracted template code and a user modified code from said modified file.

5. A system for generating a device driver based on an archived template code using a device driver generation tool, said system comprising:
one or more hardware processors;
a memory storing instructions to configure the one or more hardware processors, wherein the one or more hardware processors are configured by the instructions to execute said device driver generation tool on said system, wherein said device driver generation tool when executed by said one or more hardware processors generates said device driver based on said archived template code, wherein said device driver generation tool comprises a database that stores (i) a template archive comprising a plurality of configuration files and a plurality of template files, (ii) a set of predefined rules, (iii) a first specification and (iv) a second specification for generating said device driver specific to a hardware device and an operating system, wherein said device driver generation tool when executed by said one or more hardware processors is configured to
(i) perform a first set of instructions comprising:
extracting said plurality of configuration files and said plurality of template files from a template archive stored in said database, wherein said plurality of configuration files comprises one or more high level configuration files and one or more low level configuration files, wherein said one or more low level configuration files and said one or more high level configuration files comprises one or more labels;
parsing at least one high-level configuration file from said one or more high level configuration files, corresponding to a class of said hardware device, and said operating system for which said device driver is being generated;
simultaneously processing at least one label associated with said at least one high-level configuration file to obtain an identified label;
(ii) perform (a) a second set of instructions when said identified label is a block label, or (b) a third set of instructions when said identified label is a file label, wherein said second set of instructions comprises:
extracting template code from said plurality of template files for said block label to obtain an extracted template code; and
generating a portion of said device driver corresponding to said block label based on said extracted template code,
wherein said third set of instructions comprises:
parsing at least one low-level configuration file from said one or more low-level configuration files; and
generating said device driver using said first specification and said second specification based on said at least one low-level configuration file.

6. The system of claim 5, wherein said device driver generation tool when executed by said one or more hardware processors is configured to process said extracted template code to identify a tag in said extracted template code.

7. The system of claim 6, wherein when said tag is a customization tag, said device driver generation tool is configured to
synthesize a portion of said extracted template code specific to said customization tag based on said first specification to obtain a synthesized code; and
generate a portion of said device driver based on said synthesized code to an output file using at least one predefined rule stored in said database.

8. The system of claim 7, wherein said device driver generation tool when executed by said one or more hardware processors is further configured to process an input from a user to modify (i) a template code from said portion of said device driver to obtain a modified file, wherein said modified file comprises (i) said extracted template code, and (ii) at least one start marker and at least one end marker that indicate modifications done to said portion of said device driver.

9. The system of claim 8, wherein said device driver generation tool when executed by said one or more hardware processors is further configured to update said plurality of template files based on said modified file to obtain a plurality of updated template files.

10. The system of claim 9, wherein said device driver generation tool when executed by said one or more hardware processors is further configured to generate an updated device driver based on said plurality of updated template files for another hardware device, wherein said updated device driver comprises one or more set of codes that represent said plurality of updated template files, and wherein said one or more set of codes comprises said extracted template code and a user modified code from said modified file.

* * * * *